(12) United States Patent
Koskela et al.

(10) Patent No.: US 12,041,594 B2
(45) Date of Patent: Jul. 16, 2024

(54) REPORTING BEAM FAILURE

(71) Applicant: NOKIA TECHNOLOGIES OY, Espoo (FI)

(72) Inventors: Timo Koskela, Oulu (FI); Samuli Turtinen, Ii (FI); Chunli Wu, Beijing (CN); Mihai Enescu, Espoo (FI); Sami Hakola, Kempele (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 468 days.

(21) Appl. No.: 17/278,763

(22) PCT Filed: Aug. 7, 2019

(86) PCT No.: PCT/CN2019/099691
§ 371 (c)(1),
(2) Date: Mar. 23, 2021

(87) PCT Pub. No.: WO2020/063126
PCT Pub. Date: Apr. 2, 2020

(65) Prior Publication Data
US 2022/0039077 A1    Feb. 3, 2022

(30) Foreign Application Priority Data

Sep. 27, 2018    (WO) ................. PCT/CN2018/108130

(51) Int. Cl.
*H04W 72/044*    (2023.01)
*H04W 16/28*    (2009.01)
(Continued)

(52) U.S. Cl.
CPC ......... *H04W 72/046* (2013.01); *H04W 16/28* (2013.01); *H04W 24/10* (2013.01);
(Continued)

(58) Field of Classification Search
CPC ... H04W 72/046; H04W 72/21; H04W 72/23; H04W 16/28; H04W 24/10; H04W 72/02; H04W 72/1268; H04W 74/04
(Continued)

(56) References Cited

U.S. PATENT DOCUMENTS

2009/0232069 A1    9/2009    Sun et al.
2010/0124173 A1    5/2010    Agashe et al.
(Continued)

FOREIGN PATENT DOCUMENTS

CA    3 034 014 A1    8/2019
CN    105359612 A    2/2016
(Continued)

OTHER PUBLICATIONS

Office Action for Russian Application No. 2021111467/07 dated Oct. 12, 2021, 8 pages.
(Continued)

*Primary Examiner* — Mark G. Pannell
(74) *Attorney, Agent, or Firm* — Alston & Bird LLP

(57) ABSTRACT

Embodiments of the present disclosure relate to reporting beam failure. A terminal device detects a beam failure on one or more serving cells of the terminal device. If the beam failure is detected on the one or more serving cells, the terminal device obtains information concerning one or more candidate beams and the one or more serving cells. Each of the one or more candidate beams is associated with a respective one of the one or more serving cells. The terminal device then transmits at least a portion of the information to a network device associated with the one or more serving cells.

20 Claims, 8 Drawing Sheets

(51) Int. Cl.
  *H04W 24/10* (2009.01)
  *H04W 72/02* (2009.01)
  *H04W 72/1268* (2023.01)
  *H04W 72/21* (2023.01)
  *H04W 72/23* (2023.01)
  *H04W 74/04* (2009.01)

(52) U.S. Cl.
  CPC ....... *H04W 72/02* (2013.01); *H04W 72/1268* (2013.01); *H04W 72/21* (2023.01); *H04W 72/23* (2023.01); *H04W 74/04* (2013.01)

(58) Field of Classification Search
  USPC .......................................................... 370/329
  See application file for complete search history.

(56) References Cited

U.S. PATENT DOCUMENTS

| | | | |
|---|---|---|---|
| 2012/0182896 | A1 | 7/2012 | Jang et al. |
| 2016/0119945 | A1 | 4/2016 | Fang et al. |
| 2017/0303280 | A1 | 10/2017 | Chun et al. |
| 2017/0338923 | A1 | 11/2017 | Prasad et al. |
| 2018/0160461 | A1 | 6/2018 | Addepalli et al. |
| 2018/0191422 | A1 | 7/2018 | Xia et al. |
| 2018/0192371 | A1 | 7/2018 | Jung et al. |
| 2018/0219604 | A1 | 8/2018 | Lu et al. |
| 2018/0227899 | A1 | 8/2018 | Yu et al. |
| 2018/0234960 | A1 | 8/2018 | Nagaraja et al. |
| 2018/0234988 | A1 | 8/2018 | Shimezawa et al. |
| 2018/0270700 | A1 | 9/2018 | Babaei et al. |
| 2018/0367374 | A1* | 12/2018 | Liu ..................... H04W 16/28 |
| 2019/0045569 | A1* | 2/2019 | Abedini ............... H04W 76/14 |
| 2019/0052337 | A1* | 2/2019 | Kwon ............... H04W 74/0833 |
| 2019/0150010 | A1* | 5/2019 | Kwon ................... H04W 24/10 370/252 |
| 2019/0215888 | A1* | 7/2019 | Cirik ................. H04W 72/0446 |
| 2019/0254064 | A1* | 8/2019 | Islam ................. H04W 74/0883 |
| 2020/0244414 | A1 | 7/2020 | Takahashi et al. |
| 2020/0266876 | A1* | 8/2020 | Yu ......................... H04W 72/23 |
| 2020/0267797 | A1* | 8/2020 | Wei ....................... H04W 72/23 |
| 2020/0344621 | A1* | 10/2020 | Xu ......................... H04W 72/21 |
| 2021/0044344 | A1 | 2/2021 | Jiang |
| 2021/0204266 | A1 | 7/2021 | Ahn et al. |

FOREIGN PATENT DOCUMENTS

| | | |
|---|---|---|
| CN | 107079459 A | 8/2017 |
| CN | 107453854 A | 12/2017 |
| CN | 108112030 A | 6/2018 |
| CN | 108307688 A | 7/2018 |
| CN | 108432313 A | 8/2018 |
| CN | 108513737 A | 9/2018 |
| EP | 3567776 A1 | 11/2019 |
| JP | 2018014672 | 1/2018 |
| JP | 2019/033420 A | 2/2019 |
| JP | 2019-133388 A | 8/2019 |
| JP | 2020-140274 A | 9/2020 |
| KR | 20150020167 A | 2/2015 |
| KR | 2016/0048177 A | 5/2016 |
| RU | 2479154 C2 | 4/2013 |
| RU | 2658322 C1 | 6/2018 |
| WO | WO 2017/022870 A1 | 2/2017 |
| WO | WO 2017/024516 A1 | 2/2017 |
| WO | WO 2017/051076 A1 | 3/2017 |
| WO | WO 2018/031327 A1 | 2/2018 |
| WO | WO 2018/083230 A1 | 5/2018 |
| WO | WO 2018/128351 A1 | 7/2018 |
| WO | WO 2018/136300 A1 | 7/2018 |
| WO | WO 2018/136405 A1 | 7/2018 |
| WO | WO 2018/164332 | 9/2018 |
| WO | WO 2018/190617 A1 | 10/2018 |
| WO | WO 2018/230862 A1 | 12/2018 |
| WO | WO 2018/232090 A1 | 12/2018 |
| WO | WO 2019/032882 A1 | 2/2019 |
| WO | WO 2019/135654 A1 | 7/2019 |
| WO | WO 2019/154418 A1 | 8/2019 |
| WO | WO 2019/192713 A1 | 10/2019 |
| WO | WO 2019/196118 A1 | 10/2019 |
| WO | WO 2020/061955 A1 | 4/2020 |
| WO | WO 2020/164574 A1 | 8/2020 |
| WO | WO 2021/006681 A1 | 1/2021 |
| WO | WO 2021/018280 A1 | 2/2021 |

OTHER PUBLICATIONS

Office Action for Vietnam Application No. 1-2021-02300 dated Sep. 13, 2021, 2 pages.
Apple, "BFR Over CBRA", 3GPP TSG-RAN WG2 Meeting #103, R2-1812794, (Aug. 20-24, 2018), 6 pages.
Convida Wireless, "On Beam Failure Recovery for SCell", 3GPP TSG-RAN WG1 #97, R1-1907466, (May 13-17, 2019), 6 pages.
Decision of Refusal for Japanese Application No. 2021-516431 dated Jan. 30, 2023, 6 pages.
Decision to Grant for Japanese Application No. 2021-517191 dated Jan. 10, 2023, 5 pages.
Ericsson, "Latency Analysis of SCell BFR Solutions", 3GPP TSG-RAN WG1 Meeting #96, R1-1902957, (Feb. 25-Mar. 1, 2019), 4 pages.
First Examination Report for Indian Application No. 202127018822 dated Aug. 24, 2022, 6 pages.
Intel Corporation, "Consideration of MsgA Contents and Size", 3GPP TSG RAN WG2 #105bis, R2-1904438, (Apr. 8-12, 2019), 6 pages.
Intel Corporation, "Summary on L1-SINR and Scell BFR", 3GPP TSG RAN WG1 Meeting #97, R1-1907674, (May 13-17, 2019), 21 pages.
InterDigital Inc., "Corrections on BFR for SCell", 3GPP TSG-RAN WG2 Meeting #102, R2-1806822, (May 21-25, 2018), 3 pages.
LG Electronics Inc., "Discussion on Payload Size of msgA for 2-Step RACH", 3GPP TSG-RAN WG2 #105bis, R2-1904979, (Apr. 8-12, 2019), 6 pages.
Nokia et al., "Enhancements on Multi-Beam Operation", 3GPP TSG RAN WG1 #97 Meeting, R1-1907317, (May 13-17, 2019), 21 pages.
Office Action for Chilean Application No. 202100788 dated Jul. 11, 2022, 30 pages.
Samsung, "Beam Failure Recovery", 3GPP TSG RAN WG2 Meeting #91, R1-1720291, (Nov. 27-Dec. 1, 2017), 8 pages.
Notice of Allowance for Korean Application No. 10-2021-7012552 dated Mar. 16, 2023, 4 pages.
Office Action for Egyptian Application No. 2021030472 dated Apr. 14, 2023, 6 pages.
Office Action for Korean Application No. 10-2021-7011910 dated Jul. 29, 2022, 14 pages.
Office Action for Korean Application No. 10-2021-7012552 dated Jul. 19, 2022, 20 pages.
Office Action for Saudi Arabian Application No. 521421594 dated May 17, 2023, 8 pages.
Asia Pacific Telecom, "Enhancements on Multi-Beam Operations", 3GPP TSG RAN WG1 Meeting #97, R1-1907360, (May 13-17, 2019), 6 pages.
Extended European Search Report for European Application No. 19864314.0 dated May 27, 2022, 13 pages.
Lenovo et al., "Discussion of Beam Failure Recovery for Carrier Aggregation", 3GPP TSG RAN WG1 Meeting #92, R1-1804211, (Apr. 16-20, 2018), 3 pages.
MediaTek Inc., "Summary 2 on Remaining Issues on Beam Failure Recovery", 3GPP TSG RAN WG1 Meeting #92bis, R1-1805689, (Apr. 16-20, 2018), 21 pages.
3GPP TS 38.213 v 15.2.0, "3rd Generation Partnership Project; Technical Specification Group Radio Access Network; NR; Physical Layer Procedures for Control (Release 15)", (Jun. 2018), 99 pages.
3GPP TS 38.214 v 15.2.0, "3rd Generation Partnership Project; Technical Specification Group Radio Access Network; NR; Physical Layer Procedures for Data (Release 15)", (Jun. 2018), 95 pages.

(56) References Cited

OTHER PUBLICATIONS

3GPP TS 38.321 v15.3.0, "3rd Generation Partnership Project; Technical Specification Group Radio Access Network; NR; Medium Access Control (MAC) Protocol Specification (Release 15)", (Sep. 2018), 76 pages.
3GPP TS 38331 v15.3.0, "3rd Generation Partnership Project; Technical Specification Group Radio Access Network; NR; Radio Resource Control (RRC) Protocol Specification (Release 15)", (Sep. 2018), 445 pages.
Ericsson, "[Draft] LS on MAC CE Design for SCell BFR", 3GPP TSG-RAN WG1 Meeting #97, R1-1907850 (May 13-17, 2019), 1 page.
Intel Corporation, "Summary 2 on L1-SINR and SCell BFR", 3GPP TSG RAN WG1 Meeting #97, R1-1907825 (May 13-17, 2019), 22 pages.
International Search Report and Written Opinion for Patent Cooperation Treaty Application No. PCT/CN2018/108130 dated Jun. 14, 2019, 6 pages.
International Search Report and Written Opinion for Patent Cooperation Treaty Application No. PCT/CN2019/099691 dated Oct. 30, 2019, 7 pages.
MCC Support, "Final Report of 3GPP TSG RAN WG1 #96 v2.0.0", 3GPP TSG RAN WG1 Meeting #96bis, R1-1905837, (Apr. 8-12, 2019), 155 pages.
MCC Support, "Final Report of 3GPP TSG RAN WG1 #AH_1901 v1.0.0", 3GPP TSG RAN WG1 Meeting #96, R1-1901483, (Feb. 25-Mar. 1, 2019), 100 pages.
Samsung, "Revised WID: Enhancements on MIMO for NR", 3GPP TSG RAN Meeting #81, RP-182067 (Sep. 10-13, 2018), 5 pages.
Decision to Grant for Russian Application No. 2021111467 dated Apr. 14, 2022, 21 pages.
Extended European Search Report for European Application No. 18935535.7 dated Apr. 28, 2022, 10 pages.
Huawei et al., "RAN2 Aspects of DL Beam Management", 3GPP TSG-RAN WG2 #99bis, R2-1710562, (Oct. 9-13, 2017), 4 pages.
Huawei et al., "Remaining Issue for Beam Failure Recovery", 3GPP TSG-RAN WG2 Ad Hoc, R2-1800632, (Jan. 22-26, 2018), 4 pages.
InterDigital Inc., "BFR on Scell", 3GPP TSG-RAN WG2 Ran 2 #102, R2-1806821, (May 21-25, 2018), 2 pages.
LG Electronics, "Discussion on Beam Failure Recovery", 3GPP TSG RAN WG1 NR Ad-Hoc#2, R1-1710283, (Jun. 27-30, 2017), 7 pages.
Nokia et al., "Scell Beam Failure Recovery", 3GPP TSG-RAN WG2 Meeting #102, R2-1808024, (May 21-25, 2018), 2 pages.
Office Action for Canadian Application No. 3,114,130 dated Mar. 29, 2022, 5 pages.
Office Action for Japanese Application No. 2021-516431 dated May 16, 2022, 10 pages.
Office Action for Japanese Application No. 2021-517191 dated May 16, 2022, 8 pages.
Ericsson, "Contention Based Random Access for Beam Failure Recovery", 3GPP TSG-RAN WG2 #101, Tdoc R2-1803198, (Feb. 26-Mar. 2, 2018), 7 pages.
Notice of Acceptance for Australian Application No. 2019351162 dated Mar. 1, 2023, 3 pages.
Notice of Allowance for Canadian Application No. 3,114,130 dated May 26, 2023, 1 page.
Office Action for ARIPO Application No. AP/P/2021/013065 dated Jun. 20, 2023, 4 pages.
Office Action for Chinese Application No. 201980078023.5 dated Jul. 24, 2023, 22 pages.
Office Action for Indonesian Application No. P00202102957 dated Aug. 11, 2023, 4 pages.
Office Action for Korean Application No. 10-2023-7020314 dated Jul. 19, 2023, 13 pages.
Office Action for Singapore Application No. 11202102968Q dated Jan. 27, 2023, 9 pages.
Office Action for Thailand Application No. 2101001775 dated Jul. 21, 2023, 6 pages.
Office Action for Vietnamese Application No. 1-2021-02300 dated Aug. 14, 2023, 3 pages.
Samsung, "Contention Based BFR Procedure: Reporting Candidate Beam", 3GPP TSG-RAN2 101bis, R2-1804304, (Apr. 16-Apr. 20, 2018), 6 pages.
Sharp, "Identification of Contention Based Random Access for Beam Failure Recovery", 3GPP TSG-RAN WG2 #101, R2-1803045, (Feb. 26-Mar. 2, 2018), 3 pages.
Notice of Allowance for Vietnamese Application No. 1-2021-02300 dated Jan. 30, 2024, 2 pages.
Notice of Eligibility of Grant for Singapore Application No. 11202102968Q dated Jan. 19, 2024, 4 pages.
Office Action for Egyptian Application No. 472/2021 dated Jan. 24, 2024, 10 pages.
Office Action for Indonesian Application No. P00202102957 dated Jan. 18, 2024, 4 pages.
English translation of Office Action, including Search Report, received for Chinese Application No. 201980078023.5 dated Feb. 29, 2024, 7 pages.
Gao, Cheng, et al., "Design and implementation of beam failure recovery in 5G", 5G Communication: Application of Electronic Technology, Sep. 25, 2018, vol. 44, No. 9, China Academic Journal Electronic Publishing House, CN.
Interdigital, "Report from LTE and NR User Plane Break-Out Session", Proceedings of 3GPP Tsg-Ran WG2 Meeting #101, R2-1803735, Agenda Item 12.1.2, Feb. 26-Mar. 2, 2018, 81 pages, Greece.
Office Action for Saudi Arabian Application No. 521421594 dated Mar. 6, 2024, 18 pages.
Office Action, including Search Report, received for Chinese Application No. 201980078023.5 dated Feb. 29, 2024, 6 pages.
Decision to Grant for ARIPO Application No. AP/P/2021/013065 dated Mar. 5, 2024, 6 pages.
Office Action for Indonesian Application No. P002020102957 dated Apr. 21, 2024, 4 pages.
Office Action for Mexican Application No. MX/a/2021/003637 dated Mar. 14, 2024, 12 pages.

* cited by examiner

REPORTING BEAM FAILURE

CROSS-REFERENCE TO RELATED APPLICATION

The present application is a national phase entry of International Application No. PCT/CN2019/099691, filed Aug. 7, 2019, which claims priority from International Application No. PCT/CN2018/108130, filed on Sep. 27, 2018 and entitled "BEAM FAILURE RECOVERY FOR SERVING CELL," the entire contents of which are incorporated by reference herein in their entirety.

FIELD

Embodiments of the present disclosure generally relate to the field of telecommunication and in particular, to methods, devices, apparatuses and computer readable storage media for reporting beam failure.

BACKGROUND

New radio access system, which is also called NR system or NR network, is the next generation communication system. It has been agreed that carrier aggregation (CA) which is used in Long Term Evolution (LTE)-Advanced to increase the bandwidth will be supported in the NR system. When CA is used, there are a number of serving cells. Generally, a primary cell (PCell) and at least one secondary cell (SCell) are provided. A beam failure may occur when the quality of beam pair(s) of a serving cell falls low enough (for example, comparison with a threshold or time-out of an associated timer).

A beam failure recovery procedure is a mechanism for recovering beams when all or part of beams serving user equipment (UE) has failed. Beam recovery may be also referred to as link reconfiguration. Aim of the beam recovery is to detect when one or more physical downlink control channels (PDCCH) links are considered to be in failure conditions and recover the link. To recover the link, UE initiates signaling towards network to indicate failure and a new potential link (beam) called candidate link (beam). As a response to beam failure recovery request (BFRR) received from the UE, the network may configure UE with a new PDCCH link. Currently the beam failure recovery has been defined for one serving cell, which in practice covers beam failure recovery for PCell only. Thus, there still remains a need to provide a solution for beam failure recovery especially for SCell.

SUMMARY

In general, example embodiments of the present disclosure provide a solution for reporting beam failure.

In a first aspect, there is provided a terminal device. The terminal device comprises at least one processor; and at least one memory including computer program codes; the at least one memory and the computer program codes are configured to, with the at least one processor, cause the terminal device to detect a beam failure on one or more serving cells of the terminal device; in response to detecting the beam failure on the one or more serving cells, obtain information concerning one or more candidate beams and the one or more serving cells, each of the one or more candidate beams associated with a respective one of the one or more serving cells; and transmit at least a portion of the information to a network device associated with the one or more serving cells.

In a second aspect, there is provided a network device. The network device comprises at least one processor; and at least one memory including computer program codes; the at least one memory and the computer program codes are configured to, with the at least one processor, cause the network device to receive, from a terminal device, at least a portion of information concerning one or more candidate beams and one or more serving cells on which a beam failure is detected, each of the one or more candidate beams associated with a respective one of the one or more serving cells; and determine, based on the received portion, at least that the beam failure is detected on the one or more serving cells.

In a third aspect, there is provided a method. The method comprises detecting, at a terminal device, a beam failure on one or more serving cells of the terminal device; in response to detecting the beam failure on the one or more serving cells, obtaining information concerning one or more candidate beams and the one or more serving cells, each of the one or more candidate beams associated with a respective one of the one or more serving cells; and transmitting at least a portion of the information to a network device associated with the one or more serving cells.

In a fourth aspect, there is provided a method. The method comprises receiving, at a network device and from a terminal device, at least a portion of information concerning one or more candidate beams and one or more serving cells on which a beam failure is detected, each of the one or more candidate beams associated with a respective one of the one or more serving cells; and determining, based on the received portion, at least that the beam failure is detected on the one or more serving cells.

In a fifth aspect, there is provided an apparatus comprising means for detecting, at a terminal device, a beam failure on one or more serving cells of the terminal device; means for in response to detecting the beam failure on the one or more serving cells, obtaining information concerning one or more candidate beams and the one or more serving cells, each of the one or more candidate beams associated with a respective one of the one or more serving cells; and means for transmitting at least a portion of the information to a network device associated with the one or more serving cells.

In a sixth aspect, there is provided an apparatus comprising means for receiving, at a network device and from a terminal device, at least a portion of information concerning one or more candidate beams and one or more serving cells on which a beam failure is detected, each of the one or more candidate beams associated with a respective one of the one or more serving cells; and means for determining, based on the received portion, at least that the beam failure is detected on the one or more serving cells.

In a seventh aspect, there is provided a non-transitory computer readable medium comprising program instructions for causing an apparatus to perform at least the method according to the above third aspect.

In an eighth aspect, there is provided a non-transitory computer readable medium comprising program instructions for causing an apparatus to perform at least the method according to the above fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
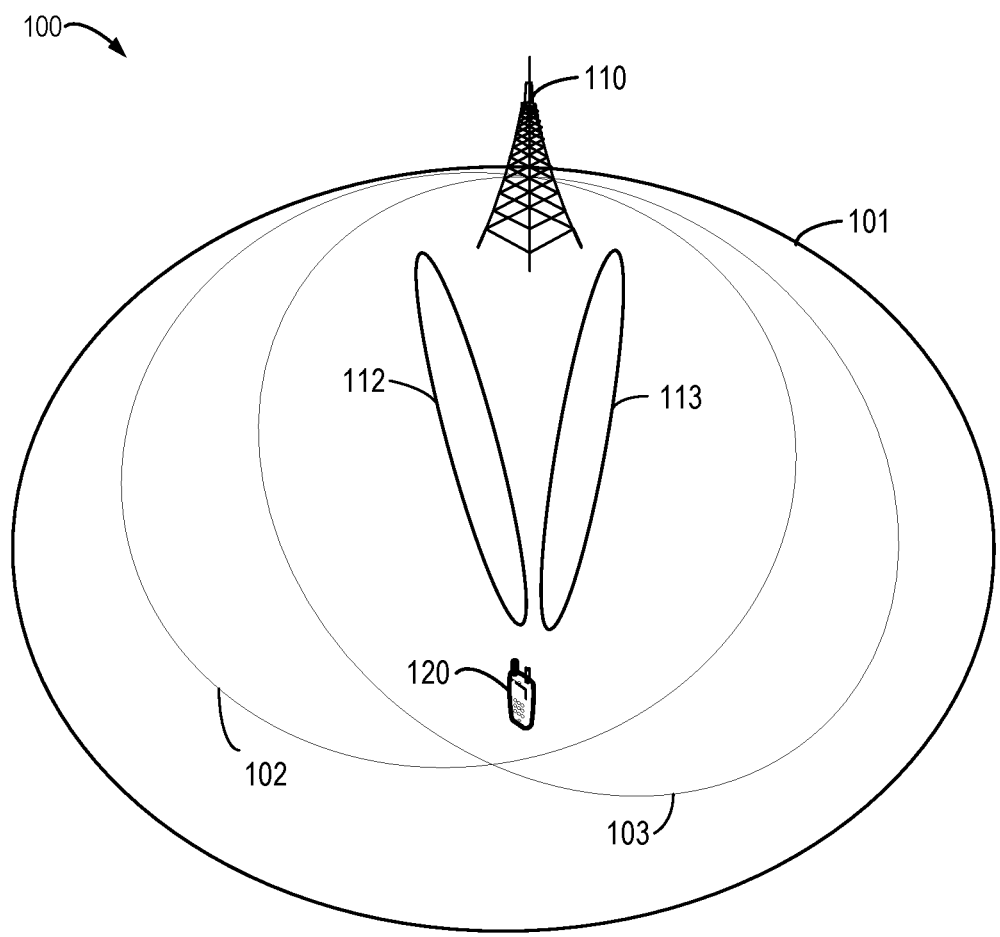
FIG. 1 illustrates an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

FIG. 1 shows an example communication network 100 in which embodiments of the present disclosure can be implemented. The network 100 includes a network device 110 and a terminal device 120 served by the network device 110. The network 100 may provide one or more serving cells 101, 102, 103 to serve the terminal device 120. It is to be understood that the number of network devices, terminal devices and serving cells is only for the purpose of illustration without suggesting any limitations. The network 100 may include any suitable number of network devices, terminal devices and serving cells adapted for implementing embodiments of the present disclosure. It is to be noted that the term "cell" and "serving cell" can be used interchangeably herein.

In the communication network 100, the network device 110 can communicate data and control information to the terminal device 120 and the terminal device 120 can also communication data and control information to the network device 110. A link from the network device 110 to the terminal device 120 is referred to as a downlink (DL) or a forward link, while a link from the terminal device 120 to the network device 110 is referred to as an uplink (UL) or a reverse link.

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

CA can be supported in the network 100, in which two or more component carriers (CCs) are aggregated in order to support a broader bandwidth. In CA scenario, the network device 110 may provide to the terminal device 120 a plurality of serving cells, for example one PCell 101 and two SCells 102, 103 as shown in FIG. 1. Although two SCells 102, 103 are shown in FIG. 1, the network device 110 may provide less or more SCells. It is also to be understood that the configuration of PCell 101 and SCells 102, 103 shown in FIG. 1 is only for the purpose of illustration without suggesting any limitations. PCell 101 and SCells 102, 103 may be in other configuration than that shown in FIG. 1.

In some example embodiments, the network 100 may comprise another network device (not shown), which may employ the same or a different radio access technology with the network device 110. The other network device may also provide the terminal device 120 with serving cells, such as a primary secondary cell (PSCell) and other SCells.

In embodiments, the network device 110 is configured to implement beamforming technique and transmit signals to the terminal device 120 via a plurality of beams. The terminal device 120 is configured to receive the signals transmitted by the network device 110 via the plurality of beams. There may be different beams configured for the PCell 101 and the SCells 102, 103. As shown in FIG. 1, DL beams 112 and 113 are configured for the SCells 102 and 103, respectively. It is to be understood that the SCells 102 and 103 may have more beams associated therewith. Although not shown, the PCell 101 may also have beams associated therewith.

As mentioned above, a beam failure may occur on any of the PCell 101 and the SCells 102, 103. To better understand the principle and example embodiments of the present disclosure, a brief introduction to the beam failure detection (BFD) and beam failure recovery (BFR) is now described below.

A network device may configure a terminal device with a set of reference signals (RSs) for monitoring the quality of the link. This set of RSs may be referred as Q0 or beam failure detection RS (BFD-RS). Typically, BFD-RS(s) are configured to be spatially QCL'd (short for 'QCL-TypeD', see below) with PDCCH demodulation reference signal (DMRS). That is, these RSs correspond to downlink beams used for PDCCH. Downlink beams are identified by RS, either synchronization signal (SS)/physical broadcast channel (PBCH) block index (time location index) or channel state information-reference signal (CSI-RS) resource (set) index. The network device may configure the BFD-RS list using Radio Resource Control (RRC) signaling or with combined RRC and medium access control (MAC) control element (CE) signaling.

When two different signals share the same QCL type, they share the same indicated properties. As an example, the QCL properties may be e.g. delay spread, average delay, Doppler spread, Doppler shift, spatial reception (RX). QCL type A means Doppler spread, Doppler shift, delay spread, and/or average delay, and QCL type D means spatial RX. Currently, QCL types are defined as following:
'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

As a further example, if a CSI-RS and an SSB have the type D QCL assumption between each other, it means that the terminal device (UE) may utilize the same RX spatial filter (beam) to receive these signals.

When the terminal device is not explicitly configured with the BFD-RS list, it determines the BFD-RS resources implicitly based on the configured/indicated/activated PDCCH-Transmission Configuration Indication (TCI) states per control resource set (CORESET) i.e. the downlink reference signals (CSI-RS, SS/PBCH block or SSB) that are spatially QCL'd with PDCCH DMRS, or in other words, PDCCH beams.

Physical layer assesses the quality of the radio link (based on BFD-RS in set of Q0) periodically. Assessment is done per BFD-RS and when the radio link condition of each BFD-RS in the beam failure detection set is considered to be in failure condition i.e. the hypothetical PDCCH Block Error Rate (BLER) estimated using the RS is above the configured threshold, a beam failure instance (BFI) indication is provided to higher layer (MAC). One example of BLER threshold value may be the out of sync threshold used for radio link monitoring OOS/Qout=10%. Evaluation and indication may be done periodically. In the case where the at least one BFD-RS is not in failure condition, no indication is provided to higher layer.

MAC layer implements a counter to count the BFI indications from the physical layer and if the BFI counter reaches a maximum value (configured by the network device), a beam failure is declared. This counter can be configured to be supervised by a timer: each time MAC receives a BFI indication from lower layer a timer is started. Once the timer expires, the BFI counter is reset (counter value is set to zero).

The network device may provide the terminal device with a list of candidate RSs for recovery that can be indicated using a dedicated signal. Candidate beam L1-Reference Signal Receiving Power (RSRP) measurements may be provided to the MAC layer which performs the selection of new candidate beam and determines the uplink resources to indicate the new candidate beam to the network device. The network device may configure the terminal device with dedicated signaling resources, such as contention free random access (CFRA) resources, which are specific to candidate beams, i.e. the terminal device can indicate new candidate beam by sending a preamble. It is to be noted that the terms "new candidate beam", "new beam" and "candidate beam" may be used can be used interchangeably herein.

Beam failure recovery procedure is initiated if the terminal device has declared a beam failure and the terminal device has detected a new candidate beam or beams based on L1 measurements (e.g., L1-RSRP). A dedicated signal can be configured (e.g. from the PRACH pool) for beam failure recovery purposes that can be used to indicate a candidate beam or in other words a beam identified by the downlink RS (reference signal, SSB or CSI-RS). This dedicated signal, can be referred to as BFR resource or CFRA resource, and it has to be noted that beam recovery procedure using CFRA signals differs slightly from Random Access (RA) procedure when it comes to gNB response to preamble reception. A dedicated preamble may be configured for each candidate RS in the Candidate-Beam-RS-List. A specific threshold may be configured so that if any of the new candidate beams (e.g., based on L1-RSRP measurements) are above the threshold, they can be indicated using the dedicated signal (set of resources in set Qi or candidate beam list). The terminal device first selects a candidate beam from that set and in the case where there are no beams above the configured threshold, the terminal device utilizes contention based signaling to indicate the new candidate beam. Contention based random access (CBRA) preamble resources are mapped to specific downlink RS (SSB or CSI-RS).

The terminal device monitors the network response to BFRR (or BFRQ) during the beam recovery response window (similar to RAR window) using the same beam alignment (i.e. same beam direction that was used for transmission (TX) is used for RX) used for transmitting the recovery signal; it expects the network device to provide response using a beam that is spatially QCL'd with the indicated downlink reference signal.

In case of contention free signaling used for beam recovery purposes, the terminal device expects the network device to respond to the UE using Cell-Radio Network Temporary Identifier (C-RNTI) instead of Radom Access-RNTI (RA-RNTI) when CFRA procedure is used. In the case where CBRA resources are used, the terminal device expects response as normally in RA procedure.

Figure 2A:
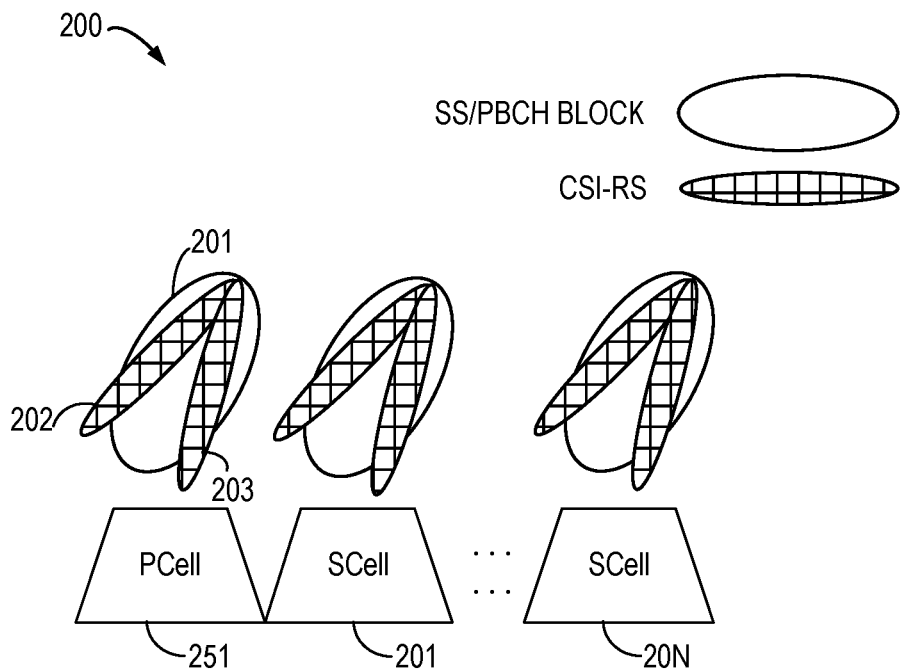
FIG. 2A is a schematic diagram illustrating a BFD-RS configuration where spatial quasi-co-location (QCL) is assumed across the carriers.
Figure 2B:
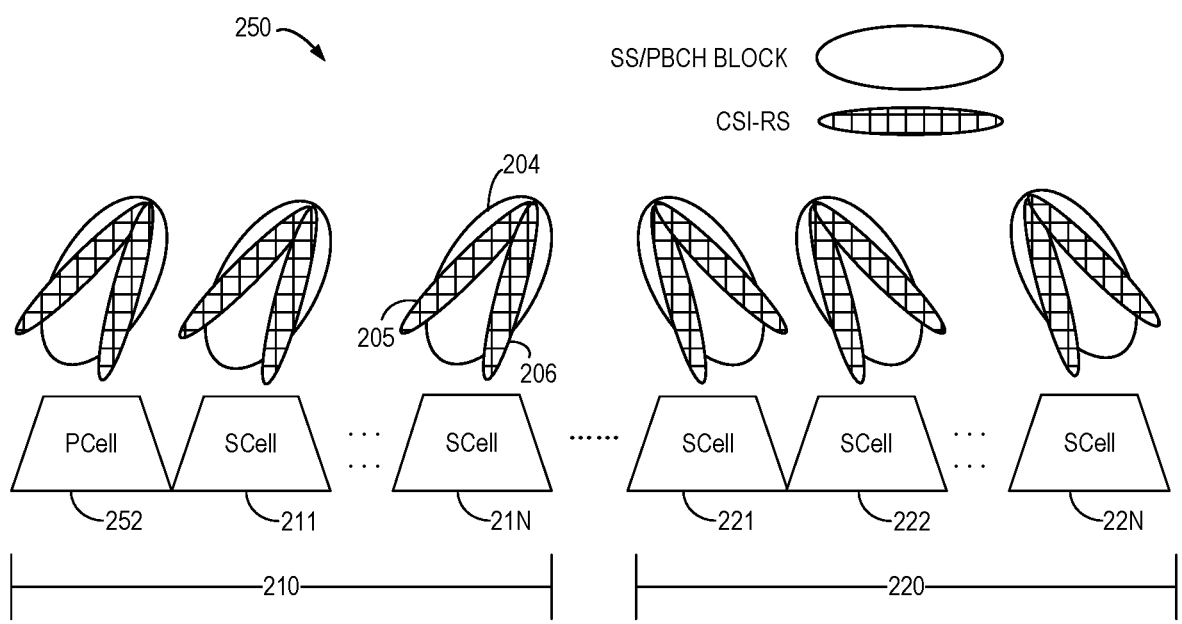
FIG. 2B is a schematic diagram illustrating a BFD-RS configuration where there is no spatial QCL assumption across the carriers.

Currently the beam failure recovery (BFR) or link reconfiguration procedure does not cover the case of beam failure recovery in CA scenario. FIG. 2A is a schematic diagram 200 illustrating a BFD-RS configuration where spatial QCL is assumed across the carriers and FIG. 2B is a schematic diagram 250 illustrating a BFD-RS configuration where there is no spatial QCL assumption across the carriers. The RSs shown in FIGS. 2A and 2B are SS/PBCH block and CSI-RS. For example, for the PCell 251, a beam 201 is configured for the SS/PBCH block and beams 202 and 203 are configured for the CSI-RS. For the SCell 21N shown in FIG. 2B, a beam 204 is configured for the SS/PBCH block and beams 205 and 206 are configured for the CSI-RS. In general, FIG. 2A illustrates a case where a group of cells may be considered to be in failure condition simultaneously. That is, if one cell is in beam failure condition, it may be considered that all the cells in the group are in failure condition. Thus, in some cases it may be possible to define only one cell for beam failure detection purposes.

In the case as shown in FIG. 2A, the cross carrier spatial QCL is valid for the PCell 251 and SCells 201-20N. A beam failure can be detected on BFD-RS resources (CSI-RS, SS/PBCH block) of the PCell 251 and it implicitly means that all the SCells 201-20N are in the beam failure condition due to spatial QCL assumption of the reference signals used for assessing the link quality.

On the other hand, in the case as shown in FIG. 2B, the spatial QCL assumption for BFD-RS does not hold across all carriers. The PCell 252 and SCells 211-21N belong to a group of cells or in a beam management group 210, and the SCells 221, 222-22N belong to a group of SCells or another beam management group 220. There is no spatial QCL assumption between cells in the beam management groups 210 and 220. In the case where none of the SCells are spatially QCL with each other, the terminal device needs to be able to detect beam failure and perform recovery for each SCell separately or for each set of SCells where each set has valid QCL assumption among its SCells. In general, FIG. 2B illustrates that when one group of cells can be considered to be in beam failure condition, another group of cells may or may not be considered to be in failure condition.

Alternatively, if the spatial QCL assumption for the BFD-RSs holds (in either FIG. 2A or FIG. 2B), but cells cannot be considered to be in beam failure condition based on the failure of one cell, then the terminal device needs to potentially report each failed SCell individually. In some cases, even with cross carrier spatial QCL for the BFD-RSs, the terminal device may need to perform the beam failure detection procedure individually for each cell, for example due to different interference conditions per carrier.

The scenario shown in FIG. 2B may occur e.g. when the PCell 252 is located in Frequency Range 1 (FR1 i.e. below 6 GHz) and the SCells 211-21N are configured on FR2 (e.g. above 6 GHz). Alternatively, both the PCell and SCells may operate on same FR, but due to the PDCCH TCI configuration (which is cell specific) the BFD-RS detection resources may be different i.e. there may not be correspondence between beam failure of the PCell and SCells. The latter may happen in particular in the case where a cell with multiple Transmission/Reception Points (TRPs) is deployed. In yet alternative case, there may not be correspondence between the failure of one group of SCells (or more generally group of serving cells) and another group of SCells (or serving cells). A group of serving cells may comprise zero, one or more SCells and PCell may be included in the group of serving cells. It is to be noted that although the term "a group of SCells" is used in the description below, a group of SCells herein may also include a PCell.

For BFR of a SCell (which is also referred to as SCell BFR herein), the terminal device shall convey new beam information to the network device during the BFR procedure if new candidate beam RS and corresponding threshold is configured and at least if channel quality of new beam is above or equal to threshold. For BFR of a PCell (which is also referred to as PCell BFR herein), the terminal device indicates the new candidate beam either using CFRA which also implicitly indicates the beam failure recovery request or CBRA during which the network device needs to determine that the terminal device might be conducting BFR (this, however, is not straightforward for the network device).

However, for SCell BFR, such an operation is not feasible. For example, in the case where the SCells are only configured for downlink, the CFRA signals would need to be mapped SCell specifically on PCell uplink. With multiple candidates per SCell and associated with CFRA candidates, the uplink overhead increases for PCell.

Moreover, the signalling solution for BFR needs to be capable of indicating index of failed CC and the new candidate beam when such a beam has been identified with a quality above the threshold. Otherwise, the terminal device should report that no candidate beam was found. In some situations, the terminal device may need to indicate the beam failure of multiple SCells and in conjunction provide candidate beam information for each of these SCells during the BFR procedure. It is desirable to achieve s signalling solution that would have capability of handling reporting of multiple candidate beams and failed cells, for example, a solution based on media access control (MAC) control element (CE) or physical uplink control channel (PUCCH)/ physical uplink shared channel (PUSCH) instead of a solution based on the random access preamble.

For MAC CE/PUCCH based BFR, the terminal device may request an uplink grant via scheduling request (SR), which may be dedicated for indicating SCell failure or normal SR/CBRA procedure in case such dedicated SR is not configured, for instance). Alternatively, the terminal device may have semi-persistent UL grant or periodic PUCCH resource which may not have sufficient size for reporting all the configured information and thus some rules would be needed for the terminal device to determine a subset of information to be reported during BFR procedure. As an example, such a case could occur when multiple SCells are in beam failure and/or each cell could have one or more candidate beams above the candidate beam threshold to be reported.

The above problem may occur in the following situations: (1) Uplink resources are not sufficient to carry all information required to be reported, e.g. UL grant is too small, UL grant has limited amount of free payload bits after other higher priority information has been included or PUCCH/PUSCH payload is not sufficient; (2) The report format such as MAC CE/PUCCH/PUSCH can accommodate only a subset of information that the terminal device is configured to report; (3) MAC CE is reported in message 3 (Msg3) of the Random Access procedure (e.g., in case the PCell has also failed or when there is no dedicated SR to request UL grant) in which case the minimum sizes defined are 7 and 9 bytes out of which 3 bytes can be used by the C-RNTI MAC CE.

In a straightforward solution, e.g. for a solution based on MAC CE, the terminal device would first send the Buffer Status Report (BSR) on the provided grant and then for the granted resources provide the candidate beam information. However, this solution may introduce additional latency for SCell recovery. Additionally, BFR information does not contribute to the buffer sizes reported on BSR and the network device may not know the size of UL grant which the terminal device seeks to have. Some solutions have been proposed for reporting beam failure. However, these solutions merely relate to how to report a beam failure on a serving cell particularly a SCell. Therefore, a mechanism for reporting the beam failure in particular the beam failure of multiple SCells is needed.

According to embodiments of the present disclosure, there is proposed a solution for reporting beam failure of serving cells, and in particular for reporting beam failure of SCells (SCell BFR). In the present disclosure, a solution about how to determine the reported information in a BFR report is proposed. When the resource allocated for the BFR report is insufficient, the terminal device may determine what information to be reported based on the proposed solution. When the resource allocated for the BFR report is sufficient, the terminal device may determine the order of different pieces of the reported information based on the proposed solution. The solution for reporting beam failure in accordance with embodiments of the present disclosure can be adapted to the beam failure occurring in multiple serving cells. Moreover, embodiments of the present disclosure can enable efficient beam failure recovery. As an example, a terminal device may be configured to signal BFR information in a specific optimized manner by reducing the amount of bits to be transmitted.

Principle and implementations of the present disclosure will be described in detail below with reference to FIG. 3, which illustrates a flowchart illustrating an example process 300 for reporting beam failure according to some embodiments of the present disclosure. For the purpose of discussion, the process 300 will be described with reference to FIG. 1. The process 300 may involve the network device 110 and the terminal device 120 as illustrated in FIG. 1.

In the example process 300, the terminal device 120 detects 302 beam failure on the serving cells. If the beam failure is detected on one or more serving cells, the terminal device 120 obtains 305 information concerning one or more candidate beams and the one or more serving cells. Each of the one or more candidate beams is associated with a respective one of the one or more serving cells. In some example embodiments, the one or more serving cells may comprises at least one SCell, e.g. the SCells 102 and 103 as shown in FIG. 1. In some example embodiments, the one or more serving cells may comprises at least one of the PCell and SCells, e.g., the PCell 101 and SCells 102 and 103 as shown in FIG. 1.

Upon detecting the beam failure on the one or more serving cells, the terminal device 120 may try to determine the candidate beam for each of the one or more serving cells, for example based on L1-RSRP measurements of the candidate RSs. If a particular candidate RS has a signal quality above a threshold quality or has the highest signal quality among the candidate RSs, the particular candidate RS may be selected as the candidate beam for the corresponding serving cell. Therefore, in some cases not each of the one or more serving cells on which the beam failure is detected has an associated candidate beam. That is, in the case where at most one candidate beam is reported for a failed cell, the number of the one or more candidate beam may be equal to or less than the number of the one or more failed cells.

In some example embodiments, the network device 110 may configure the terminal device 120 with a threshold quality for selecting the candidate beam. The information concerning the one or more candidate beams to be included in the BFR report may comprise an indication of a candidate RS, for example one of the following: an index of a candidate RS with a signal quality above the threshold quality and included in the candidate RS list, for example the SSB/CSI-RS (or Non-zero-power CSI-RS, NZP-CSI-RS) list configured by the network device 110 and or activated by MAC CE; an index of a candidate RS with a signal quality above the threshold quality and being an SSB signal/NZP-CSI-RS resource; an index of a candidate RS with a signal quality above the threshold quality and configured for L1-RSRP reporting; an index of a candidate RS with a signal quality above the threshold quality and being an SSB, which means that in this case the candidate beam is always a SSB; an index of a TCI state for PDSCH or PDCCH for the serving cell. In some example embodiments, there may not be a specific candidate RS list but any configured downlink RS can be considered as a potential candidate beam. In some example embodiments, indicating a candidate RS for one cell may be considered as indication of candidate beams for one or more cells as an example for a group of SCells (which may include PCell). In some cases, even if the cells may be grouped, a candidate beam may be indicated individually for each cell.

In a full BFR report, the information concerning the one or more candidate beams and the one or more serving cells may comprise three parts. The first part may comprise an indication of the one or more serving cells on which the beam failure is detected, for example, in the format of a bitmap. The second part may comprise an indication of the availabilities of candidate beam for each of the one or more serving cells, for example in the format of another bitmap. The third part may comprise indications of the one or more candidate beam, for example indices of the corresponding RSs as mentioned above.

In some example embodiments, the SCells, e.g. the SCells 102 and 103, may be grouped for beam failure recovery. The information concerning the one or more serving cells on which the beam failure is detect (which may be referred to as failed cells or failed SCells herein) may comprise a first bitmap which indicates all the failed SCells/SCell groups regardless of whether the information concerning the corresponding candidate beam would be reported to the network device 110. The first bitmap may be also referred to as a cell index bitmap herein only for purpose of discussion.

In some example embodiments, in the full BFR report, the information may further comprise a second bitmap which indicates the availability of the candidate beam for each of the failed SCells/SCell groups. The second bitmap may also be referred to as a candidate beam bitmap herein only for purpose of discussion. In some example embodiments, the second bitmap may be used to indicate whether a failed SCell/SCell group has a candidate beam with a quality above the threshold quality. In some example embodiments, the second bitmap may be used to indicate whether a candidate beam for a failed SCell/SCell group is reported to the network device 110.

Figure 4:
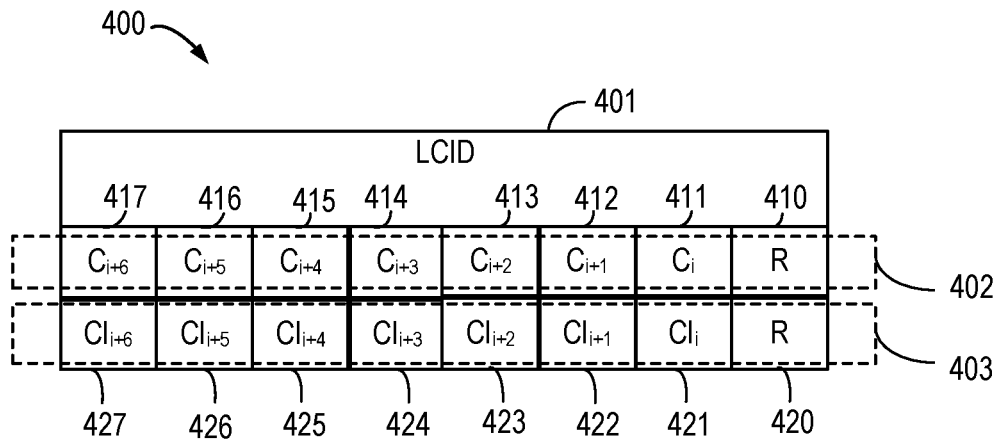
FIG. 4 shows a schematic diagram illustrating an example format for reporting beam failure according to some embodiments of the present disclosure.

Reference is now made to FIG. 4, which shows a schematic diagram illustrating an example format 400 for reporting beam failure according to some embodiments of the present disclosure. As shown in FIG. 4, the example format 400 comprises a first bitmap 402 and each of the bits 411-417 corresponds to an SCell or a group of SCells. For example, the group of SCells may be a beam management group (e.g. the beam management group shown in FIG. 2B) comprising SCells that share a common beam failure criterion. In other words, when one of the SCells in the group of SCells is in beam failure condition, the other SCells in the same group are also in beam failure condition. Although FIG. 4 shows seven bits, the bitmap length in FIG. 4 should be considered as a non-limiting example and different numbers of bits can be included. In some example embodiments, the bitmap length may be up to the maximum number of SCells that are configured or can be configured.

In the case where the each of the bits 411-417 corresponds to an SCell, $C_i$-$C_{i+6}$ may refer to SCell indices. When the corresponding bit is assigned with a predetermined value (e.g. "1"), it indicates that a beam failure has occurred on the corresponding SCell; when the corresponding bit is assigned with another predetermined value (e.g. "0"), it indicates that a beam failure has not detected on the corresponding SCell. As an example, the bit corresponding to the SCell 102 is the $C_{i+1}$ bit 412. Then, the value of the $C_{i+1}$ bit 411 may be set to be "1" when the beam failure is detected on the SCell 102. Values may be also considered as vice versa.

In the case where the each of the bits 411-417 corresponds to a group of SCells, the indexing of the bitmap 402 is logical. In this case, the bits 411-417 are not directly mapped to the indices of the SCells but to the groups. In other words, the bitmap 402 indicates the SCells in logical order for where the failure has been detected. When the corresponding bit is assigned with a predetermined value (e.g. "1"), it indicates that beam failures have occurred on the SCells in the group; when the corresponding bit is assigned with another predetermined value (e.g. "0"), it indicates that a beam failure has not detected on the SCells in the group.

As shown in FIG. 4, the example format 400 further comprises a second bitmap 403 and each of the bits 421-427 corresponds to an SCell or a group of SCells. A pair of bits in the first bitmap 402 and the second bitmap 403 corresponds to the same SCell or the same group of SCells. Taking the SCells shown in FIG. 1 as an example, both the $C_{i+1}$ bit 412 and the $CI_{i+2}$ bit 422 may correspond to the SCell 102, while both the $C_{i+2}$ bit 413 and the $CI_{i+2}$ bit 423 may correspond to the SCell 103.

In some example embodiments, if a SCell has a candidate beam with a quality above the threshold quality, the corresponding bit in the second bitmap 420 may be assigned with a predetermined value (e.g. "1"). Still refer to the example discussed above with respect to FIG. 1. If the beam failure is detected on the SCell 102 and the SCell 102 has a candidate beam with a quality above the threshold quality, the $CI_{i+1}$ bit 422 may be assigned with the value "1". Values may be also considered as vice versa.

In some example embodiments, if an indication of a candidate beam for a SCell will be included in the BFR report, the corresponding bit in the second bitmap 420 may be assigned with the predetermined value (e.g. "1"). For example, the candidate beam for the SCell 102 will be reported to the network device 110, the $CI_{i+1}$ bit 422 may be assigned with the value "1". Values may be also considered as vice versa.

The example format 400 may further comprise a field 401 to identify that the information is used for BFR. In the case where the information is carried by means of MAC CE, this field may be a Logical Channel ID, LCID to identify that the MAC CE is used for BFR.

Figure 5:
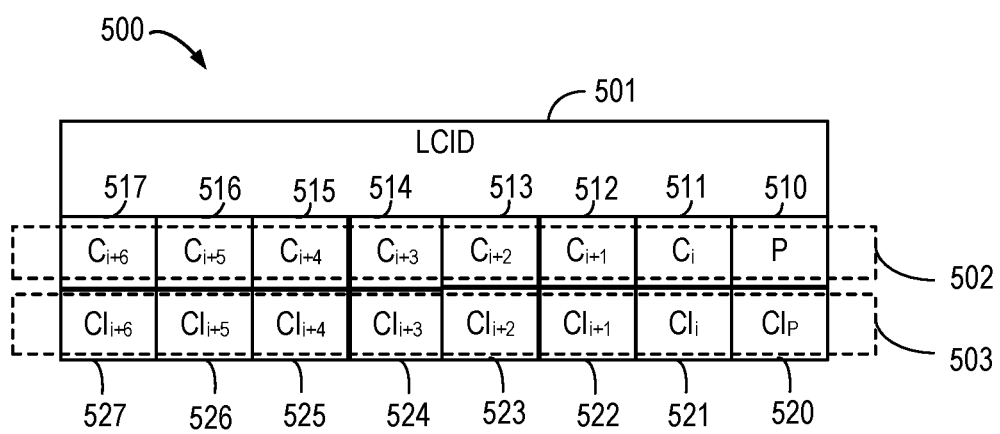
FIG. 5 shows a schematic diagram illustrating an example format for reporting beam failure according to some embodiments of the present disclosure.

In some example embodiments, the reporting format may include a further field associated with the PCell serving the terminal device, for example, the PCell 101 serving the terminal device 120 shown in FIG. 1. In the example format 400 shown in FIG. 4, the R bits 410 and 420 are reserved. FIG. 5 shows another example format 500 in accordance with some embodiments of the present disclosure.

The example format 500 comprises LCID field 501, a first bitmap 502 including bits 510-517, and a second bitmap 503 including bits 520-527. The LCID field 501, the bits 511-517, and the bits 521-527 are similar as the LCID field 401, the bits 411-417 and the bits 521-527, respectively. The P bit 510 in the first bitmap 502 may be used to indicate whether a beam failure has been detected on the PCell 101. For example, when the terminal device 120 has detected a beam failure on the PCell 101, the terminal device 120 may assign the value "1" to the P bit 510.

The $CI_P$ bit 520 in the second bitmap 503 may be used to indicate whether the PCell 101 has a candidate beam with a quality above the threshold quality. For example, when the terminal device 120 has detected a candidate beam above the threshold quality, the terminal device 120 may assign the value "1" to the $CI_P$ bit 520. Alternatively, the $CI_P$ bit 520 may be used to indicate whether the candidate beam for the PCell 101 is reported to the network device 110.

It is to be understood that although a certain number of fields are shown in FIGS. 4 and 5, the reporting format for BFR may include more or less fields to indicate the beam failure. For example, when less than 7 SCells or groups of SCells are involved, some of the bits 411-417 may be reserved and when more than 7 SCells or groups of SCells are involved, the first and second bitmaps may be extended to include additional bits.

As mentioned above, the full BFR report may comprise indications of the one or more candidate beam for all or some of the failed SCells. In some example embodiments, only the candidate beam(s) with a quality above the threshold quality is required to be reported to the network device 110. For example, if the beam failure has been detected on the SCell 102, the terminal device 120 may select a new beam for the SCell 102. The terminal device 120 may determine signal qualities of a plurality of candidate RSs configured for the SCell 102, for example based on L1-RSRP measurements. For example, the plurality of candidate RSs can be either from the candidate RS list (explicitly configured by the network device 110) or any DL RS e.g. SSB/CSI-RS. In some example embodiments, the candidate beams can be DL RSs configured for L1-RSRP reporting.

The terminal device 120 may then detect from the plurality of candidate RSs a candidate RS with a signal quality above the threshold quality. If the candidate RS with a signal quality above the threshold quality is detected, the terminal device 120 may generate an indication of the detected candidate RS as part of the information concerning the one or more candidate beams. The indication may be an index of the candidate RS with a signal quality above the threshold quality.

In such example embodiments, the full BFR report may only comprise indications of candidate beams with signal qualities above the threshold quality. As such, there may be a failed SCells which does not have an indicated candidate beam. These candidate beams may be prioritized according to one or more of the priority orders described below.

Alternatively, in some example embodiments, for the failed SCells, both the candidate beam above and below the threshold quality may be required to be reported to the network device 110. For example, if no candidate beam with a quality above the threshold quality is detected for a certain failed SCell, e.g. the SCell 103, the terminal device 120 may generate an indication of a candidate RS from among the plurality of the candidate RSs with the highest signal quality as part of the information concerning the one or more candidate beams. The indication may be an index of the candidate RS with the highest signal quality.

In such example embodiments, the full BFR report may comprise indications of candidate beams for each of the failed serving cells, for example, each of the failed SCells. These candidate beams may be first prioritized based on their qualities. For example, the candidate beams above the threshold quality may be prioritized over the candidate beams below the threshold quality.

In any of the examples herein, the measured quantity of the candidate beam may be reported together with the index of the candidate RS. As an example, the quantity may be at least one of RSRP, Reference Signal Receiving Quality (RSRQ), Signal to Interference plus Noise Ratio (SINR) or the like.

Figure 6:
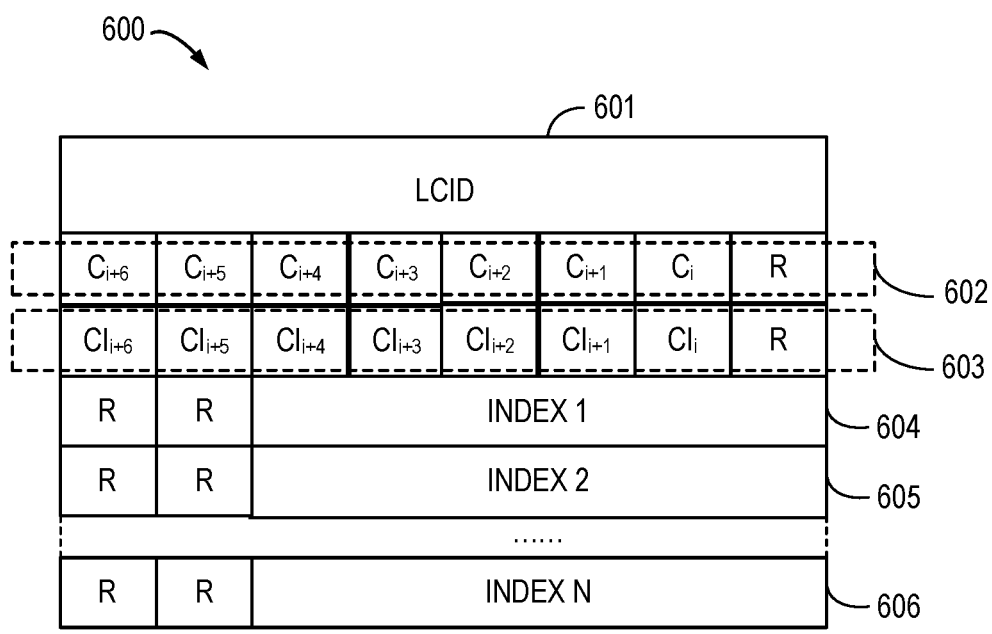
FIG. 6 shows a schematic diagram illustrating an example format for reporting beam failure according to some embodiments of the present disclosure.

Reference is now made to FIG. 6, which shows a schematic diagram illustrating an example format 600 for reporting beam failure according to some embodiments of the present disclosure. The example format 600 comprise a LCID field 601, a first bitmap 602 and a second bitmap 603, which may be similar as the LCID field 401, the first bitmap 402 and the second bitmap 403 as shown in FIG. 4, respectively. The example format 600 further comprises the fields 604, 605 and 606, which are used to indicate the one or more candidate beams for the failed SCells. In the example format 600, each of the one or more candidate beams is indicated by the index of the corresponding candidate RS. The indices 1, 2, . . . , N may be arranged in the report based on one or more of the priority orders to be described below.

Figure 3:
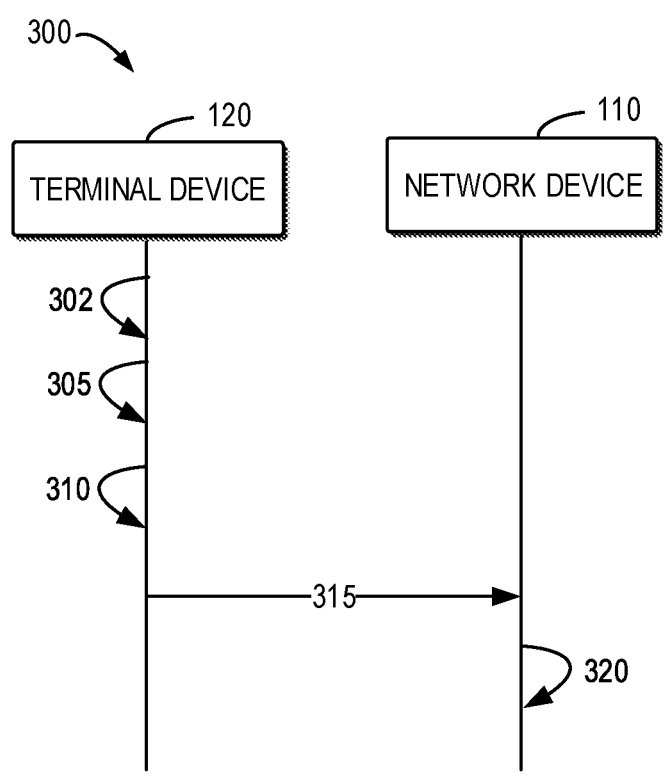
FIG. 3 illustrates a flowchart illustrating an example process for reporting beam failure according to some embodiments of the present disclosure.

Reference is now made back to FIG. 3. The terminal device 120 determines 310, based on amount of the information, whether a resource allocated for transmitting the information is sufficient. The terminal device 120 may determine whether the allocated uplink resource can carry all the information concerning the failed serving cells and the one or more candidate beams, for example all the three parts of information mentioned above. The uplink resource may be a resource indicated by a UL grant or a periodic PUCCH resource.

The terminal device 120 transmits 315 at least a portion of the information concerning the failed serving cells and the one or more candidate beams to the network device 110 associated with the one or more serving cells. If the resource is sufficient, the terminal device 120 transmits all the information concerning the failed serving cells and the one or more candidate beams to the network device 110. For example, the information may be transmitted in the format as shown in FIG. 6. In such a case, it means that the full BFR report is transmitted by the terminal device 120. In the full BFR report, the indications of the one or more candidate beams may be arranged based on one or more of the priority orders as described below, which may be known to both the terminal device 120 and the network device 110.

If the resource is insufficient, the terminal device 120 transmits only a portion of the information to the network device 110. In such a case, it means that a truncated BFR report is transmitted by the terminal device 120. Details of how the terminal device 120 determines the transmitted portion of information is described now.

The first part of information comprising the indication of the failed cells, for example the failed SCells, may have the highest priority. For example, the first bitmap 602 as shown in FIG. 6 may have the highest priority. Therefore, there may be a case where only the cell index bitmap (e.g. the first bitmap 402, 502, 602) is transmitted to the network device 110 due to very limited payload size of the uplink resource. As such, when the terminal device 120 has determined to trigger BFR report in MAC CE to the network device 110 and has used CBRA to request resources, the terminal device 120 may include the BFR report into message 3 (Msg3). If Msg3 cannot accommodate the cell index bitmap and the candidate beam bitmap, the candidate beam bitmap may be omitted and the terminal device 120 may transmit only the cell index bitmap.

In some example embodiments, reporting of the candidate beam for PCell may be prioritized over reporting of the candidate beam for any SCell/SCell group. For example, the candidate beam for the PCell/PSCell could be reported in the case where the BFR report is transmitted on a non-failed SCell (for example, in the example format 500 as shown in FIG. 5). Otherwise, the PRACH preamble transmitted on the PCell/PSCell indicates the candidate beam for the PCell/PSCell. It may be restricted that the BFR report in MAC CE may be only transmitted on a resource indicated by a UL grant which is resulted from a Random Access procedure, like Msg3 or Msg5.

In some example embodiments, in the case where no SCells have been configured for beam failure detection and the BFR report is in the format of MAC CE (which may be referred to as BFR MAC CE), the MAC sub-header for BFR MAC CE (i.e., the byte with the LCID) may suffice for indication of PCell/PSCell failure (e.g., when transmitted in the Msg3).

The indications of the candidate beams for different SCells may also be prioritized based on for example the signal qualities of these candidate beams and the SCell corresponding to each of the candidate beams. For example, in the example embodiments where the full BFR report comprises both candidate beams above and below the threshold quality, the candidate beam(s) with a quality above the threshold quality may be prioritized over the candidate beam(s) with a quality below the threshold quality.

Some example priority orders based on the corresponding SCells are given. An example priority order may be based on the indices of SCells/SCell groups. For example, the network device 110 may explicitly configure a priority order based on the indices of SCells/SCell groups. Alternatively, the priority order may be based on an ascending/descending order of indices of SCells/SCell groups (or logical index). As an example, if the priority order is based on a descending order of indices of SCells and the SCell 103 has the lowest or highest index among the failed SCells for the terminal device 120, then the indication of the candidate beam associated with the SCell 103 may be omitted by the terminal device 120.

Another example priority order may be based on whether a SCell is in a same group the PCell, such as the PCell 101. For example, the SCell in the same group with the PCell may be prioritized. Different types of groups may be defined and considered. For example, in the scenario of dual connection, SCells that are in the same cell group with the PCell may be prioritized. As another example, SCells that are in the same PUCCH group or timing advance (TA) group with PCell may be prioritized. As a further example, SCells that are in the same beam management group with the PCell may be prioritized. In other words, SCells are prioritized so that cells which are grouped for beam failure detection purposes or for new candidate beam purposes with PCell are prioritized.

A further example priority order may be based on the number of other SCells associated with a particular SCell. For example, a SCell associated with most other SCells may be prioritized. In other words, the SCells in a group with more cells (a larger group size) may be prioritized over the SCells in a group with fewer cells (a smaller group size).

Another example priority order may be based on the carrier configuration of the SCells. For SCells that have candidate beams above the threshold quality according to intra-band or inter-band configuration of the cells, the SCell (s) configured with intra-band carriers may have a higher priority than the SCell(s) configured with inter-band carriers.

A further example priority order may be based on transmissions scheduled on the SCells. For example, the most recently scheduled SCells are prioritized in the reporting. Determination of the most recently scheduled SCells may be based on for which SCell the terminal device 120 has transmitted Hybrid Automatic Repeat reQuest (HARQ) acknowledgements (ACK) most recently or for example aperiodically triggered CSI report.

As still a further example priority order, SCells with UL synchronization may be prioritized. In other words, SCells within the Timing Adjustment Group (TAG) with Timing Alignment Timer (TAT) running may be prioritized. As yet a further example priority order, activated SCells may be prioritized, for example, in the case where the terminal device 120 performs beam failure detection for so called dormant cells that it measures but does not decode PDCCH on those cells.

The priority of a candidate beam is determined based on the priority of corresponding SCell. The indication of a first candidate beam with a higher priority is prioritized over the indication of a second candidate beam with a lower priority. As such, when the resource is insufficient, the indication of the second candidate beam may be omitted in the BFR report. For example, if the SCell 102 has a higher priority than the SCell 103, the candidate beam for the SCell 102 is prioritized over the candidate beam for the SCell 103. That is, the indication of the candidate beam for the SCell 102 may be arranged in a position preceding the indication of the candidate beam for the SCell 103. When the uplink resource is insufficient, the indication of the candidate beam for the SCell 103 may be omitted while the indication of the candidate beam for the SCell 102 may not be omitted.

In determining information about which candidate beams can be included in the transmitted portion, i.e. in the truncated report, the above example priority orders may be combined. For example, if two or more candidate beams have an equal priority based on a priority order, another priority order may be used by the terminal device 120 until one candidate beam is selected. The terminal device 120 may select the portion of information to be transmitted to the network device 1120 based on one or more of the above priority orders until the selected portion can be accommodated by the uplink resource.

In example embodiments, the terminal device 120 may first determine to include at least the indication of all failed serving cell (for example, the first bitmap or the cell index bitmap) before proceeding to determine which candidate beams or which candidate beam would be reported to the network device 110.

The full BFR report or the truncated BFR report may be transmitted in a variety of ways. For example, the full BFR report or the truncated BFR report may be transmitted in one of the following: a RRC message, a MAC CE, PUSCH or PUCCH. If the truncated BFR report is transmitted by the terminal device 120, the terminal device 120 may further transmit to the network device 110 an indication that the information about the beam failure is partially transmitted. For example, an LCID field with a predetermined value or another dedicated field in the report may be used to indicate the truncated BFR report.

In some example embodiments, information concerning the failed cells and information concerning the one or more candidate beams may be transmitted in a same message, for example in the same message where the failed cells are indicated. Alternatively, the information concerning the failed cells and the information concerning the one or more candidate beams may be transmitted in different messages. The information concerning the one or more candidate beams, for example, the candidate beam bitmap and the indices of the candidate RSs, may be transmitted in a separate message after SCell failure has been indicated. For the example shown in FIG. 6, the second bitmap 603 and the bytes comprising the fields 604-606 may be transmitted after the first bitmap 601 is transmitted.

In some example embodiments, when the threshold quality is configured by the network device 120, the format for reporting beam failure may not have any measurement quantity information (e.g., RSRP). In such a case, selection of a candidate beam for a serving cell (for example, the SCell 102) by the terminal device 120 is sufficient for the network device 110 and the specific quality of that candidate beam may not be reported to the network device 110.

Still refer to FIG. 3. The network device 110 receives 320 at least a portion of information concerning the one or more candidate beams and the one or more serving cells on which the beam failure is detected. Based on the received portion of information, the network device 110 at least determines 320 that the beam failure has been detected on the indicated one or more serving cell.

If the network device 110 receives a full BFR report, for example if the LCID field indicates a full report, the candidate beam bitmap (for example, the second bitmap 403, 503 or 603) may indicate all the failed cells with candidate beams above the threshold quality. That is, those cells, which are indicated as "1" in the cell index bitmap (for example, the first bitmap 402, 502 or 602) but indicated as "0" in the candidate beam bitmap, do not have candidate beams above the threshold quality. If the network device 110 receives a truncated BFR report, for example if the LCID field indicates a truncated report, the candidate beam bitmap (for example, the second bitmap 403, 503 or 603) may indicate the cells with candidate beams which are reported based on one or more of the above priority orders. That is, at least one cell, which is indicated as "1" in the cell index bitmap (for example, the first bitmap 402, 502 or 602) and "0" in the candidate beam bitmap, has a candidate beam which is above the threshold quality but is not reported. In such a case, the network device 110 may provide a further UL grant to obtain the full information concerning the beam failure of the terminal device 120.

In some example embodiments, when the truncated BFR report is transmitted, the terminal device 120 may transmit the remaining portion of the information concerning the one or more candidate beams and the one or more failed serving cells. When the terminal device 120 has reported truncated BFR report, the full BFR report may be considered as pending until for example the terminal device 120 has transmitted the full BFR report.

Alternatively, the full BFR report may be considered as pending until the terminal device 120 has transmitted all the information that was originally included in the full BFR report, e.g. the terminal device 120 may report the remaining information not included in the truncated report or transmit full BFR report.

As another example, the full BFR report may be considered as pending until the terminal device 120 determines that the reported information has changed, for example, information concerning the candidate beam(s) has changed for the non-reported SCell(s). If resource indicated by the UL grant after transmitting the truncated BFR report cannot accommodate the full report, the terminal device 120 may determine to transmit a further truncated report excluding already reported candidate beams.

More details of the example embodiments in accordance with the present disclosure will be described with reference to FIGS. 7-8.

Figure 7:
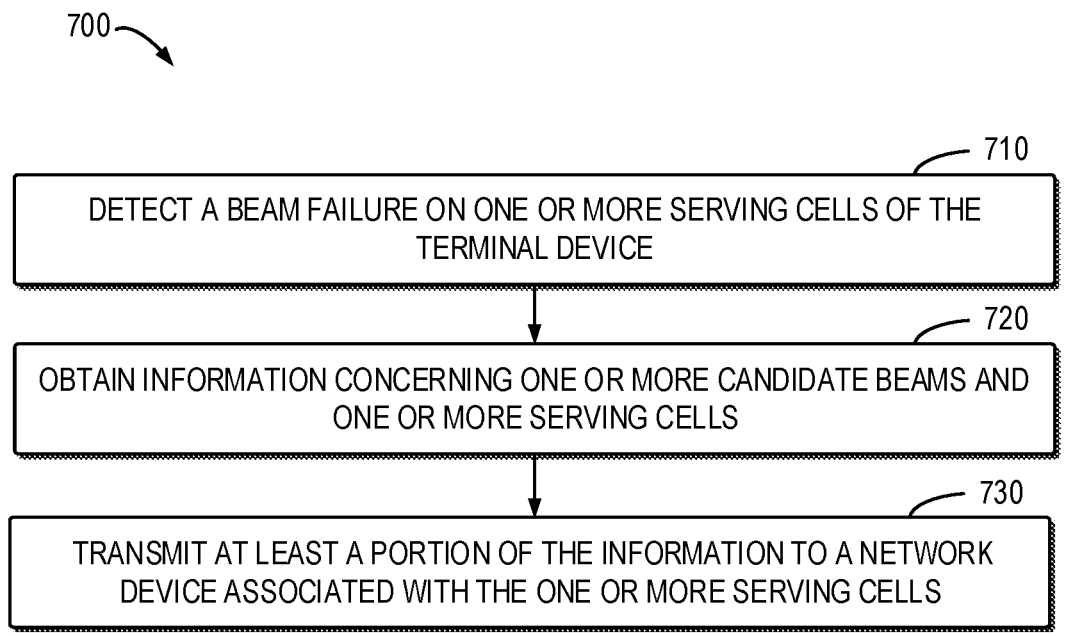
FIG. 7 illustrates a flowchart of an example method according to some embodiments of the present disclosure.

FIG. 7 shows a flowchart of an example method 700 according to some example embodiments of the present disclosure. The method 700 can be implemented at a device e.g. at the terminal device 120 as shown in FIG. 1. For the purpose of discussion, the method 700 will be described with reference to FIG. 1.

At block 710, the terminal device 120 detects a beam failure on one or more serving cells of the terminal device. If the beam failure is detected on the one or more serving cells, at block 720 the terminal device 120 obtains information concerning one or more candidate beams and the one or more serving cells. Each of the one or more candidate beams is associated with a respective one of the one or more serving cells. At block 730, the terminal device 120 transmits at least a portion of the information to a network device 110 associated with the one or more serving cells.

In some example embodiments, the information comprises a first bitmap including a plurality of bits corresponding to a plurality of serving cells for the terminal device, and a bit of the plurality of bits corresponding to each of the one or more serving cell is assigned with a first predetermined value.

In some example embodiments, the information comprises a second bitmap including a plurality of bits corresponding to a plurality of serving cells for the terminal device, and a bit of the plurality of bits is assigned with a second predetermined value if the corresponding serving cell satisfies one of the following: that a candidate beam for the corresponding serving cell has a quality above a threshold; or that an indication of a candidate beam for the corresponding serving cell is included in the transmitted portion.

In some example embodiments, transmitting at least a portion of the information comprises: determining, based on amount of the information, whether a resource allocated for transmitting the information is sufficient; and in response to a determination that the resource is insufficient, transmitting a portion of the information to the network device.

In some example embodiments, transmitting the portion of the information comprises: selecting at least one candidate beam of the one or more candidate beams; and transmitting an indication of the selected at least one candidate beam to the network device.

In some example embodiments, a first candidate beam of the one or more candidate beams is associated with a secondary cell of the one or more serving cells, and selecting the first candidate beam as one of the at least one candidate beam if: a signal quality of the first candidate beam exceeds a threshold quality, the secondary cell has the lowest index in the one or more serving cells, the secondary cell has the highest index in the one or more serving cells, the secondary cell belongs to a same group with a primary cell for the terminal device, the secondary cell is associated with a plurality of further secondary cells, the secondary cell is configured with intra-band carriers, or a transmission has been scheduled on the secondary cell.

In some example embodiments, the one or more serving cells include a serving cell, and obtaining the information comprising: determining signal qualities of a plurality of candidate reference signals configured for the serving cell; detecting from the plurality of candidate reference signals a candidate reference signal with a signal quality above a threshold quality; and in response to detecting the candidate reference signal with the signal quality above the threshold quality, generating an indication of the detected candidate reference signal as at least part of information concerning the one or more candidate beams.

In some example embodiments, the method 700 further comprises: in response to absence of the candidate reference signal with the signal quality above the threshold quality, generating an indication of a candidate reference signal from among the plurality of the candidate reference signals with the highest signal quality as at least part of information concerning the one or more candidate beams.

In some example embodiments, the method 700 further comprises transmitting an indication that the information is partially transmitted.

In some example embodiments, the method 700 further comprises transmitting a remaining portion of the information to the network device 110.

In some example embodiments, the portion of the information is transmitted in one of the following: a radio resource control message, a MAC CE, a PUSCH, or a physical uplink control channel.

Figure 8:
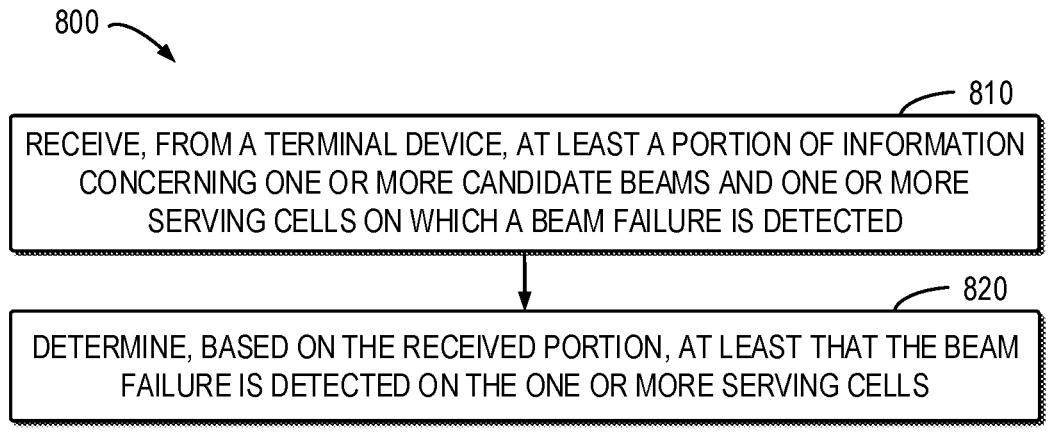
FIG. 8 illustrates a flowchart of an example method according to some embodiments of the present disclosure.

FIG. 8 shows a flowchart of an example method 800 according to some example embodiments of the present disclosure. The method 800 can be implemented at a device e.g. at the network device 110 as shown in FIG. 1. For the purpose of discussion, the method 800 will be described with reference to FIG. 1.

At block 810, the network device 110 receives, from a terminal device 120, at least a portion of information concerning one or more candidate beams and one or more serving cells on which a beam failure is detected. Each of the one or more candidate beams is associated with a respective one of the one or more serving cells. At block 820, the network device 110 determines, based on the received portion, at least that the beam failure is detected on the one or more serving cells.

In some example embodiments, the information comprises a first bitmap including a plurality of bits corresponding to a plurality of serving cells for the terminal device, and a bit of the plurality of bits corresponding to each of the one or more serving cell is assigned with a first predetermined value.

In some example embodiments, the information comprises a second bitmap including a plurality of bits corresponding to a plurality of serving cells for the terminal device, and a bit of the plurality of bits is assigned with a second predetermined value if the corresponding serving cell satisfies one of the following: that a candidate beam for the corresponding serving cell has a quality above a threshold; or that an indication of a candidate beam for the corresponding serving cell is included in the received portion.

In some example embodiments, receiving at least a portion of the information comprises receiving a portion of the information In some example embodiments, the received portion comprises an indication of at least one candidate beam of the one or more candidate beams. The method 800 further comprises: determining, from the one or more serving cells, at least one serving cell associated with the at least one candidate beam.

In some example embodiments, a first candidate beam of the at least one candidate beam is associated with a secondary cell of the one or more serving cells, and determining the at least one serving cell comprises determining the secondary cell as one of the at least one serving cell if: the secondary cell has the lowest index in the one or more serving cells, the secondary cell has the highest index in the one or more serving cells, the secondary cell belongs to a same group with a primary cell for the terminal device, the secondary cell is associated with a plurality of further secondary cells, the secondary cell is configured with intra-band carriers, or a transmission has been scheduled on the secondary cell.

In some example embodiments, the method 800 further comprises receiving an indication that the information is partially transmitted.

In some example embodiments, the method 800 further comprises receiving a remaining portion of the information from the terminal device.

In some example embodiments, the at least portion of the information is received in one of the following: a radio resource control message, a MAC CE, a PUSCH or a physical uplink control channel.

In some example embodiments, an apparatus capable of performing the method 700 may comprise means for performing the respective steps of the method 700. The means may be implemented in any suitable form. For example, the means may be implemented in a circuitry or software module.

In some example embodiments, the apparatus comprises: means for detecting, at a terminal device, a beam failure on one or more serving cells of the terminal device; means for in response to detecting the beam failure on the one or more serving cells, obtaining information concerning one or more candidate beams and the one or more serving cells, each of the one or more candidate beams associated with a respective one of the one or more serving cells; and means for transmitting at least a portion of the information to a network device associated with the one or more serving cells.

In some example embodiments, the information comprises a first bitmap including a plurality of bits corresponding to a plurality of serving cells for the terminal device, and a bit of the plurality of bits corresponding to each of the one or more serving cell is assigned with a first predetermined value.

In some example embodiments, the information comprises a second bitmap including a plurality of bits corresponding to a plurality of serving cells for the terminal device, and a bit of the plurality of bits is assigned with a second predetermined value if the corresponding serving cell satisfies one of the following: that a candidate beam for the corresponding serving cell has a quality above a threshold; or that an indication of a candidate beam for the corresponding serving cell is included in the transmitted portion.

In some example embodiments, the means for transmitting at least a portion of the information comprises: means for determining, based on amount of the information, whether a resource allocated for transmitting the information is sufficient; and means for in response to a determination that the resource is insufficient, transmitting a portion of the information to the network device.

In some example embodiments, the means for transmitting the portion of the information comprises: means for selecting at least one candidate beam of the one or more candidate beams; and means for transmitting an indication of the selected at least one candidate beam to the network device.

In some example embodiments, a first candidate beam of the one or more candidate beams is associated with a secondary cell of the one or more serving cells, and r selecting the first candidate beam as one of the at least one candidate beam if: a signal quality of the first candidate beam exceeds a threshold quality, the secondary cell has the lowest index in the one or more serving cells, the secondary cell has the highest index in the one or more serving cells, the secondary cell belongs to a same group with a primary cell for the terminal device, the secondary cell is associated with a plurality of further secondary cells, the secondary cell is configured with intra-band carriers, or a transmission has been scheduled on the secondary cell.

In some example embodiments, the one or more serving cells include a serving cell, and the means for obtaining the information comprising: means for determining signal qualities of a plurality of candidate reference signals configured for the serving cell; means for detecting from the plurality of candidate reference signals a candidate reference signal with a signal quality above a threshold quality; and means for in response to detecting the candidate reference signal with the signal quality above the threshold quality, generating an indication of the detected candidate reference signal as at least part of information concerning the one or more candidate beams.

In some example embodiments, the apparatus further comprises: means for in response to absence of the candidate reference signal with the signal quality above the threshold quality, generating an indication of a candidate reference signal from among the plurality of the candidate reference signals with the highest signal quality as at least part of information concerning the one or more candidate beams.

In some example embodiments, the apparatus further comprises means for transmitting an indication that the information is partially transmitted.

In some example embodiments, the apparatus further comprises means for transmitting a remaining portion of the information to the network device 110.

In some example embodiments, the at least portion of the information is transmitted in one of the following: a radio resource control message, a MAC CE, or a physical uplink control channel.

In some example embodiments, an apparatus capable of performing the method 800 may comprise means for performing the respective steps of the method 800. The means may be implemented in any suitable form. For example, the means may be implemented in a circuitry or software module.

In some example embodiments, the apparatus comprises: means for receiving, at a network device and from a terminal device, at least a portion of information concerning one or more candidate beams and one or more serving cells on which a beam failure is detected, each of the one or more candidate beams associated with a respective one of the one or more serving cells; and means for determining, based on the received portion, at least that the beam failure is detected on the one or more serving cells.

In some example embodiments, the information comprises a first bitmap including a plurality of bits corresponding to a plurality of serving cells for the terminal device, and a bit of the plurality of bits corresponding to each of the one or more serving cell is assigned with a first predetermined value.

In some example embodiments, the information comprises a second bitmap including a plurality of bits corresponding to a plurality of serving cells for the terminal device, and a bit of the plurality of bits is assigned with a second predetermined value if the corresponding serving cell satisfies one of the following: that a candidate beam for the corresponding serving cell has a quality above a threshold; or that an indication of a candidate beam for the corresponding serving cell is included in the received portion.

In some example embodiments, receiving at least a portion of the information comprises receiving a portion of the information.

In some example embodiments, the received portion comprises an indication of at least one candidate beam of the one or more candidate beams. The apparatus further comprises: means for determining, from the one or more serving cells, at least one serving cell associated with the at least one candidate beam.

In some example embodiments, a first candidate beam of the at least one candidate beam is associated with a secondary cell of the one or more serving cells, and the means for determining the at least one serving cell comprises means for determining the secondary cell as one of the at least one serving cell if: the secondary cell has the lowest index in the one or more serving cells, the secondary cell has the highest index in the one or more serving cells, the secondary cell belongs to a same group with a primary cell for the terminal device, the secondary cell is associated with a plurality of further secondary cells, the secondary cell is configured with intra-band carriers, or a transmission has been scheduled on the secondary cell.

In some example embodiments, the apparatus further comprises means for receiving an indication that the information is partially transmitted.

In some example embodiments, the apparatus further comprises means for receiving a remaining portion of the information from the terminal device.

In some example embodiments, the at least portion of the information is received in one of the following: a radio resource control message, a MAC CE, a PUSCH or a physical uplink control channel.

Figure 9:
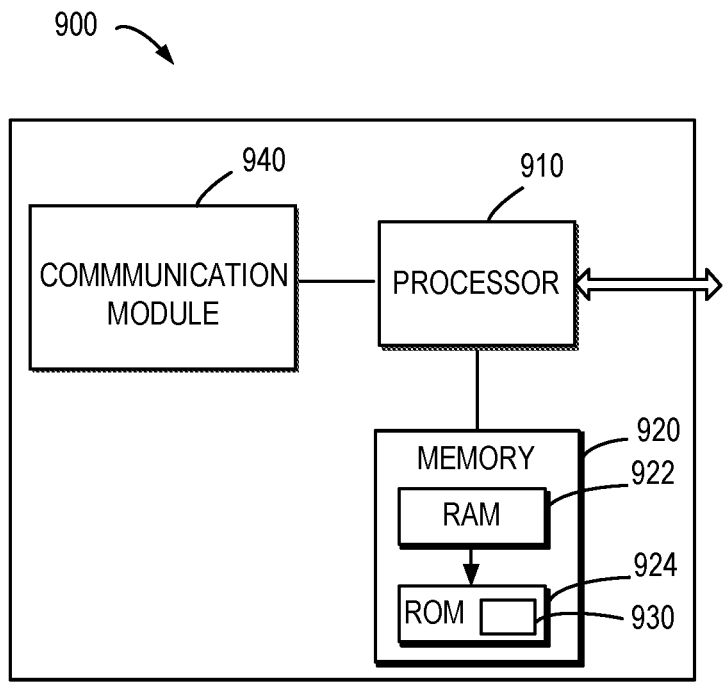
FIG. 9 illustrates a simplified block diagram of an apparatus that is suitable for implementing embodiments of the present disclosure.

FIG. 9 is a simplified block diagram of a device 900 that is suitable for implementing embodiments of the present disclosure. The device 900 may be provided to implement the communication device, for example the terminal devices 120 or the network device 110 as shown in FIG. 1. As shown, the device 900 includes one or more processors 910, one or more memories 920 coupled to the processor 910, and one or more communication modules 940 coupled to the processor 910.

The communication module 940 is for bidirectional communications. The communication module 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 920. The processor 910 may perform any suitable actions and processing by loading the program 930 into the RAM 920.

The embodiments of the present disclosure may be implemented by means of the program 930 so that the device 900 may perform any process of the disclosure as discussed with reference to FIGS. 7 to 8. The embodiments of the present disclosure may also be implemented by hardware or by a combination of software and hardware.

Figure 10:
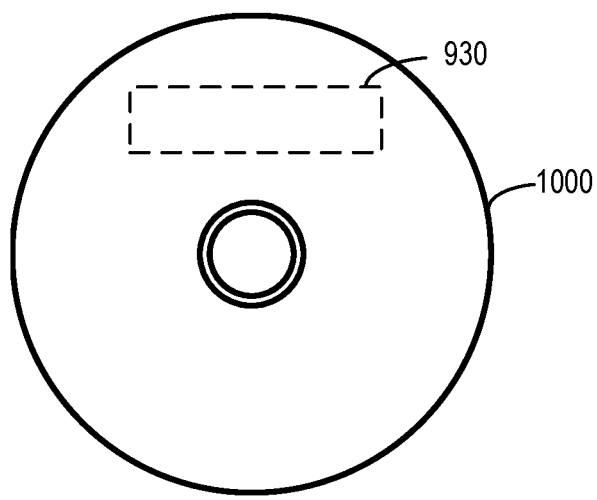
FIG. 10 illustrates a block diagram of an example computer readable medium in accordance with some embodiments of the present disclosure.

In some embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 930 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 700 or 800 as described above with reference to FIGS. 7-8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising:
   at least one processor; and
   at least one memory including program codes;
   the at least one memory and the program codes are configured to, with the at least one processor, cause the terminal device at least to:
   detect a beam failure on one or more serving cells for the terminal device;
   in response to detecting the beam failure on the one or more serving cells, obtain information concerning one or more candidate beams and the one or more serving cells, each of the one or more candidate beams associated with a respective one of the one or more serving cells;
   transmit at least a portion of the information to a network device associated with the one or more serving cells; and
   determine, based on an amount of the information, whether a resource allocated for transmitting the information is sufficient, and
   in response to determining that the resource is sufficient, said transmitting at least a portion of the information to the network device associated with the one or more serving cells comprises transmitting, to the network device associated with the one or more serving cells, a full beam failure recovery (BFR) report in a medium access control (MAC) control element (CE), which contains all the information, and
   in response to determining that the resource is insufficient, said transmitting at least a portion of the information to the network device associated with the one or more serving cells comprises transmitting, to the network device associated with the one or more serving cells, a truncated beam failure recovery (BFR) report in a medium access control (MAC) control element (CE), which contains only a portion of the information,
   wherein the information comprises a first bitmap including a plurality of bits corresponding to a plurality of serving cells for the terminal device, and wherein a bit of the plurality of bits corresponding to a respective serving cell of the one or more serving cells is assigned with a predetermined value, and
   wherein the information comprises a second bitmap including a plurality of bits corresponding to a plurality of serving cells for the terminal device, and wherein a bit of the plurality of bits is assigned with a predetermined value if the corresponding serving cell satisfies the following:
   that a candidate beam for the corresponding serving cell has a quality above a threshold; and
   that an indication of the candidate beam for the corresponding serving cell is included in the transmitted portion.

2. The terminal device of claim 1, wherein the terminal device is caused to transmit the truncated BFR report after determining that a resource allocated for transmitting the information in full is insufficient.

3. The terminal device of claim 2, wherein a full BFR MAC CE is otherwise transmitted which contains the information in full.

4. The terminal device of claim 1, wherein the terminal device is further caused to
   select at least one candidate beam of the one or more candidate beams; and
   include an indication of the selected at least one candidate beam in the portion of the information.

5. The terminal device of claim 4, wherein the at least one candidate beam is associated with a secondary cell of the one or more serving cells, wherein the one or more serving cells are indicated by one or more indices, and the at least one candidate beam is selected based at least on one of the following criteria:
   a signal quality of a first candidate beam exceeds a threshold quality,
   the secondary cell has the lowest index of the indices of the one or more serving cells,
   the secondary cell has the highest index of the indices of the one or more serving cells,
   the secondary cell belongs to a same group with a primary cell for the terminal device,
   the secondary cell is associated with a plurality of further secondary cells,
   the secondary cell is configured with intra-band carriers, or
   a transmission has been scheduled on the secondary cell.

6. The terminal device of claim 1, wherein the one or more serving cells include a serving cell, and wherein the terminal device is caused to obtain the information by:
   determining signal qualities of a plurality of candidate reference signals configured for the serving cell;
   detecting from the plurality of candidate reference signals a candidate reference signal having a signal quality above a threshold quality; and
   generating an indication of the detected candidate reference signal as at least part of information concerning the one or more candidate beams.

7. The terminal device of claim 6, wherein the terminal device is further caused to:
   generate an indication of a candidate reference signal, which is identified from the plurality of candidate reference signals, as having the highest signal quality of the signal qualities of the plurality of candidate reference signals, and wherein the indication is included in information concerning the one or more candidate beams.

8. The terminal device of claim 1, wherein the terminal device is further caused to:
   transmit an indication that the information is partially transmitted.

9. The terminal device of claim 1, wherein the terminal device is further caused to:
   transmit a remaining portion of the information to the network device.

10. The terminal device of claim 1, wherein the portion of the information includes information concerning at least one of the one or more candidate beams, which is selected based on a priority order of the one or more candidate beams.

11. The terminal device of claim 10, wherein the priority order is based on an ascending order of indices of the one or more serving cells.

12. A network device, comprising:
    at least one processor; and
    at least one memory including program codes;
    the at least one memory and the program codes are configured to, with the at least one processor, cause the network device at least to:
        receive, from a terminal device, a truncated beam failure recovery (BFR) report in a medium access control (MAC) control element (CE), which contains only a portion of information, wherein the information concerns one or more candidate beams and one or more serving cells on which a beam failure is detected, each of the one or more candidate beams associated with a respective one of the one or more serving cells, or
        receive, from the terminal device, a full beam failure recovery (BFR) report in a medium access control (MAC) control element (CE), which contains all the information; and
    determine, based on the portion of the information, that at least one beam failure is reported for the one or more serving cells,
    wherein the information comprises a first bitmap including a plurality of bits corresponding to a plurality of serving cells for the terminal device, and wherein a bit of the plurality of bits corresponding to a respective serving cell of the one or more serving cells is assigned with a predetermined value, and
    wherein the information comprises a second bitmap including a plurality of bits corresponding to a plurality of serving cells for the terminal device, and wherein a bit of the plurality of bits is assigned with a predetermined value if the corresponding serving cell satisfies the following:
        that a candidate beam for the corresponding serving cell has a quality above a threshold; and
        that an indication of the candidate beam for the corresponding serving cell is included in the portion of the information.

13. The network device of claim 12, wherein the network device is caused to receive the truncated BFR report in an instance in which a resource allocated for transmitting the information in full is insufficient.

14. The network device of claim 13, wherein a full BFR MAC CE is otherwise received which contains the information in full.

15. The network device of claim 12, wherein the portion of the information comprises an indication of at least one candidate beam of the one or more candidate beams, and the network device is further caused to:
    determine, from the one or more serving cells, at least one serving cell associated with the at least one candidate beam.

16. The network device of claim 15, wherein a first candidate beam of the at least one candidate beam is associated with a secondary cell of the one or more serving cells, wherein the one or more serving cells are indicated by one or more indices, and the network device is configured to determine the secondary cell as one of the at least one serving cell if:
    the secondary cell has the lowest index of the indices of the one or more serving cells,
    the secondary cell has the highest index of the indices of the one or more serving cells,
    the secondary cell belongs to a same group with a primary cell for the terminal device,
    the secondary cell is associated with a plurality of further secondary cells,
    the secondary cell is configured with intra-band carriers, or
    a transmission has been scheduled on the secondary cell.

17. The network device of claim 12, wherein the network device is further caused to:
    receive an indication that the information is partially transmitted.

18. The network device of claim 12, wherein the network device is further caused to:
    receive a remaining portion of the information from the terminal device.

19. The network device of claim 12, wherein the portion of the information includes information concerning at least one of the one or more candidate beams which is selected based on a priority order of the one or more candidate beams.

20. The network device of claim 19, wherein the priority order is based on an ascending order of indices of the serving cells.

* * * * *